(12) United States Patent
Tu et al.

(10) Patent No.: US 8,366,097 B2
(45) Date of Patent: Feb. 5, 2013

(54) CLUTCH TRANSMISSION MECHANISM OF PRINTING DEVICE

(75) Inventors: Tung-Wen Tu, Guangzhou (CN); Jian Zeng, Taipei (TW); Jian-Gju Yu, Guangzhou (CN)

(73) Assignee: Primax Electronics Ltd., Taipei (TW)

( * ) Notice: Subject to any disclaimer, the term of this patent is extended or adjusted under 35 U.S.C. 154(b) by 404 days.

(21) Appl. No.: 12/819,773

(22) Filed: Jun. 21, 2010

(65) Prior Publication Data

US 2011/0198181 A1 Aug. 18, 2011

(30) Foreign Application Priority Data

Feb. 12, 2010 (TW) .............................. 99104591 A

(51) Int. Cl.
 B65H 5/00 (2006.01)
 F16D 47/02 (2006.01)
 F16D 11/04 (2006.01)
 F16D 11/10 (2006.01)

(52) U.S. Cl. ................. 271/10.13; 271/4.04; 271/10.04; 192/69.82; 192/69.83; 192/48.5

(58) Field of Classification Search ............... 271/10.13, 271/264, 10.04, 4.04; 192/48.5, 48.8, 69.82, 192/69.83, 89.27
See application file for complete search history.

(56) References Cited

U.S. PATENT DOCUMENTS

| 7,669,496 | B2 * | 3/2010 | Takahashi | 74/337 |
| 7,766,317 | B2 * | 8/2010 | Okuno | 271/10.13 |
| 8,276,474 | B2 * | 10/2012 | Kim et al. | 74/405 |
| 2002/0007688 | A1 * | 1/2002 | Punko | 74/405 |
| 2003/0209849 | A1 * | 11/2003 | Lee et al. | 271/10.04 |
| 2010/0238256 | A1 * | 9/2010 | Motoki et al. | 347/218 |

* cited by examiner

Primary Examiner — Patrick Cicchino
(74) Attorney, Agent, or Firm — Kirton McConkie; Evan R. Witt

(57) ABSTRACT

A clutch transmission mechanism of a printing device includes a power input shaft, a power input gear, a gear-shifting arm, a first gear-shifting module and a second gear-shifting module. In the cooperation of these components and modules, the printing device can be operated in a first gear-shifting mode or a second first gear-shifting mode. When the printing device can be operated in a first gear-shifting mode or a second first gear-shifting mode, the clutch transmission mechanism coaxially transmits the driving force. As such, the stability of transmitting the driving force is enhanced.

5 Claims, 13 Drawing Sheets

CLUTCH TRANSMISSION MECHANISM OF PRINTING DEVICE

FIELD OF THE INVENTION

The present invention relates to a clutch transmission mechanism, and more particularly to a clutch transmission mechanism of a printing device.

BACKGROUND OF THE INVENTION

Printing devices are essential information apparatuses in modern offices. The printing devices include for example copiers, printers, scanners and multifunction peripherals. Among these printing devices, printers are the most popular. Generally, after a printer is connected to a computer, the document file of the computer could be printed on many kinds of media (e.g. blank papers).

FIG. 1 is a schematic perspective view illustrating an inkjet printer according to the prior art. As shown in FIG. 1, the inkjet printer 1 comprises an ink cartridge 10, plural ink nozzles (not shown), a transmission mechanism 11, a sheet input tray 12 and a sheet output tray 13. The ink cartridge 10 is used for storing ink. The ink nozzles are used for ejecting ink. The ink nozzles are disposed at the bottom of the transmission mechanism 11. The transmission mechanism 11 is used for moving the ink nozzles, so that the ink could be ejected through the ink nozzles of inkjet printer 1 and printed on any position of a blank paper P. The sheet input tray 12 is used for placing the blank paper P. After an inkjet printing operation is performed, the paper P is exited to the sheet output tray 13.

During the printing process of the inkjet printer 1, the blank paper P on the sheet input tray 12 is fed into the inkjet printer 1 in a feeding direction Y, and the transmission mechanism 11 is moved in a printing direction X. The printing direction X is perpendicular to the feeding direction Y. After the inkjet printing operation is completed, the paper P is exited to the sheet output tray 13.

Moreover, the internal components within the inkjet printer 1 comprise a sheet pick-up shaft (not shown), a sheet transfer shaft (not shown), a sheet ejecting shaft (not shown), . . . , and so on. By these internal components, the blank paper P could be transported from the sheet input tray 12 to the sheet output tray 13. For operating the internal components, the inkjet printer needs to provide the driving force to the internal components. Conventionally, the inkjet printer has several motors for respectively providing driving forces to the internal components for performing the printing purpose. The uses of too many motors are not cost-effective. For reducing the fabricating cost, an inkjet printer having a clutch mechanism has been disclosed. This clutch mechanism uses a single motor to transmit the driving force to many components. In other words, the clutch mechanism could transmit the driving forces to specified components according to the practical requirements. As such, the applications of the inkjet printer 1 are expanded. For example, since the use of a single motor could change the rotating speed of the sheet pick-up shaft, the papers P with different materials could be smoothly fed into the internal portion of the inkjet printer 1 from the sheet input tray 12.

For example, U.S. Pat. No. 5,841,450 disclosed a clutch-type power switching mechanism of an inkjet printer. FIG. 2 is a schematic view illustrating a power switching structure disclosed in U.S. Pat. No. 5,841,450. The power switching mechanism 2 is used for delivering the driving force of a motor 3 to a sheet pick-up module 4 including a sheet transfer shaft 41 and a feeding gear 42, or delivering the driving force to an ink cartridge purge module 5. The motor 3 is coaxial with a motor gear 6. The motor 3 provides a driving force to the motor gear 6 to drive rotation of the motor gear 6. The sheet transfer shaft 41 is coaxial with the feeding gear 42, and the sheet transfer shaft 41 is rotated with the feeding gear 42. The ink cartridge purge module 5 comprises a pump (not shown) and a pump gear 51. As the pump gear 51 is rotated, the pump is driven to carry out a purge operation so as to purge the ink cartridge.

The power switching mechanism 2 further comprises an idle kicker 21, a clutch gear set 22, a clutch shaft 23 and a spring 24. The clutch gear set 22 is sheathed around the clutch shaft 23. The clutch gear set 22 comprises a first gear 221, a second gear 222 and a third gear 223. The spring 24 provides an elastic force to the clutch gear set 22 for urging the clutch gear set 22 to move along the clutch shaft 23 in a direction A. The idle kicker 21 provides a pushing force to the clutch gear set 22 for driving the clutch gear set 22 to move along the clutch shaft 23 in a direction B. The motor gear 6 and the second gear 222 are engaged with each other at all times, and thus the clutch gear set 22 is continuously rotated with the motor gear 6. In a case that the clutch gear set 22 is moved along the clutch shaft 23 in the direction B, the third gear 223 is engaged with the feeding gear 42 to drive rotation of the feeding gear 42, and thus the sheet transfer shaft 41 is rotated. Whereas, in a case that the clutch gear set 22 is moved along the clutch shaft 23 in the direction A, the first gear 221 is engaged with the pump gear 51 to drive rotation of the pump gear 51, and thus the ink cartridge purge module 5 is enabled.

Although the above clutch-type power switching mechanism is able to transmit the driving force of the motor 3 to the sheet pick-up module 4 or the ink cartridge purge module 5, there are still some drawbacks. For example, since the clutch gear set 22 and the motor gear 6 for transmitting the driving force are non-coaxially but radially engaged with each other, the gap error resulted from the process of fabricating the inkjet printer may deteriorate the transmission stability between the gears. In this situation, undesired noise is generated.

SUMMARY OF THE INVENTION

It is an object of the present invention to provide a clutch transmission mechanism of a printing device, so that the printing device can be operated in different gear-shifting modes. Moreover, the driving force is coaxially transmitted by the clutch transmission mechanism in order to enhance the stability of transmitting the driving force.

In accordance with an aspect of the present invention, there is provided a clutch transmission mechanism of a printing device for transmitting a driving force of the printing device to a transmission gear module of the printing device. The clutch transmission mechanism includes a power input shaft, a power input gear, a gear-shifting arm, a first gear-shifting module and a second gear-shifting module. The power input gear is sheathed around and fixed on the power input shaft. The gear-shifting arm includes a movable shaft collar and a sustaining part. The movable shaft collar is sheathed around the power input shaft, and movable along the power input shaft. The first gear-shifting module includes a first clutch shaft, a first connecting gear, a first clutch gear and a first elastic element. The first clutch shaft is disposed on the printing device. The first connecting gear is sheathed around the first clutch shaft and engaged with the power input gear. The first connecting gear includes a first claw surface. A first claw part is disposed on the first claw surface. The first clutch gear is sheathed around the first clutch shaft. The first clutch gear includes a second claw surface. A second claw part is disposed on the second claw surface. The first elastic element is arranged between the first claw surface of the first connecting gear and the second claw surface of the first clutch gear for providing a first elastic force, so that the first claw part and the second claw part are separated from each other by a first spacing interval. The second gear-shifting module includes a second clutch shaft, a second connecting gear, a second clutch gear and a second elastic element. The second clutch shaft is disposed on the printing device. The second connecting gear is sheathed around the second clutch shaft and engaged with the power input gear. The second connecting gear includes a third claw surface. A third claw part is disposed on the third claw surface. The second clutch gear is sheathed around the second clutch shaft. The second clutch gear includes a fourth claw surface. A fourth claw part is disposed on the fourth claw surface. The second elastic element is arranged between the third claw surface of the second connecting gear and the fourth claw surface of the second clutch gear for providing a second elastic force, so that the third claw part and the fourth claw part are separated from each other by a second spacing interval. When the movable shaft collar of the gear-shifting arm is rotated by a first angle and a first pushing force greater than the first elastic force is applied on the movable shaft collar, the sustaining part pushes the first clutch gear to cause engagement between the second claw part of the first clutch gear and the first claw part of the first connecting gear and engagement between the first clutch gear and the transmission gear module, so that the transmission gear module is driven to operate in a first gear-shifting mode. Whereas, when the movable shaft collar of the gear-shifting arm is rotated by a second angle and a second pushing force greater than the second elastic force is applied on the movable shaft collar, the sustaining part pushes the second clutch gear to cause engagement between the fourth claw part of the second clutch gear and the third claw part of the second connecting gear and engagement between the second clutch gear and the transmission gear module, so that the transmission gear module is driven to operate in a second gear-shifting mode.

In an embodiment, the printing device further includes a sheet pick-up module. The sheet pick-up module includes a sheet pick-up roller, a sheet pick-up gear and a driving shaft. The sheet pick-up roller is used for feeding a paper into a feeding channel of the printing device. The sheet pick-up gear is engaged with the transmission gear module. The driving shaft is for driving the sheet pick-up roller to rotate. The driving shaft penetrates through the sheet pick-up gear. The sheet pick-up gear is fixed on the driving shaft, so that the driving shaft is rotated with the sheet pick-up gear. When the transmission gear module is operated in the first gear-shifting mode, the sheet pick-up roller is rotated in a first rotating speed. Whereas, when the transmission gear module is operated in the second gear-shifting mode, the sheet pick-up roller is rotated in a second rotating speed.

In an embodiment, the movable shaft collar of the gear-shifting arm further includes a fifth claw part.

In an embodiment, the clutch transmission mechanism further includes a fixed shaft collar, which is sheathed around and fixed on the power input shaft and has a six claw part.

In an embodiment, the clutch transmission mechanism further includes a sleeve, a positioning ring and a third elastic element. The sleeve is sheathed around the power input shaft and connected to the movable shaft collar. The fixed shaft collar is enclosed by the sleeve. The sleeve includes a poking part. The positioning ring is sheathed around and fixed on the power input shaft. The third elastic element is arranged between the sleeve and the positioning ring. When a third pushing force is applied on the poking part, the sleeve moves the movable shaft collar of the gear-shifting arm toward the fixed shaft collar, so that the fifth claw part is engaged with the sixth claw part. The third elastic element provides the first pushing force and the second pushing force to disengage the fifth claw part from the sixth claw part.

In accordance with another aspect of the present invention, there is provided a clutch transmission mechanism of a printing device for transmitting a driving force of the printing device to a transmission gear module of the printing device. The clutch transmission mechanism includes a power input shaft, a power input gear, a gear-shifting arm, a clutch gear, a first gear-shifting module and a second gear-shifting module. The power input gear is sheathed around and fixed on the power input shaft. The gear-shifting arm includes a movable shaft collar and a sustaining part. The movable shaft collar is sheathed around the power input shaft, and movable along the power input shaft. The clutch gear is connected to the sustaining part of the gear-shifting arm. The clutch gear includes a clutch claw surface. A clutch claw part is disposed on the clutch claw surface. The first gear-shifting module includes a first clutch shaft and a first connecting gear. The first clutch shaft is disposed on the printing device. The first connecting gear is sheathed around the first clutch shaft and engaged with the power input gear. The first connecting gear includes a first claw surface. A first claw part is disposed on the first claw surface. The second gear-shifting module includes a second clutch shaft and a second connecting gear. The second clutch shaft is disposed on the printing device. The second connecting gear is sheathed around the second clutch shaft and engaged with the power input gear. The second connecting gear includes a second claw surface. A second claw part is disposed on the second claw surface. When the movable shaft collar of the gear-shifting arm is rotated by a first angle and a first pushing force is applied on the movable shaft collar, the clutch gear is moved toward the first connecting gear and the first clutch shaft penetrates through the clutch gear to cause engagement between the clutch claw part of the clutch gear and the first claw part of the first connecting gear and engagement between the clutch gear and the transmission gear module, so that the transmission gear module is driven to operate in a first gear-shifting mode. Whereas, when the movable shaft collar of the gear-shifting arm is rotated by a second angle and a second pushing force is applied on the movable shaft collar, the clutch gear is moved toward the second connecting gear and the second clutch shaft penetrates through the clutch gear to cause engagement between the clutch claw part of the clutch gear and the second claw part of the second connecting gear and engagement between the clutch gear and the transmission gear module, so that the transmission gear module is driven to operate in a second gear-shifting mode.

In an embodiment, the printing device further includes a sheet pick-up module. The sheet pick-up module includes a sheet pick-up roller, a sheet pick-up gear and a driving shaft. The sheet pick-up roller is used for feeding a paper into a feeding channel of the printing device. The sheet pick-up gear is engaged with the transmission gear module. The driving shaft is for driving the sheet pick-up roller to rotate. The driving shaft penetrates through the sheet pick-up gear. The sheet pick-up gear is fixed on the driving shaft, so that the driving shaft is rotated with the sheet pick-up gear. When the transmission gear module is operated in the first gear-shifting mode, the sheet pick-up roller is rotated in a first rotating speed. Whereas, when the transmission gear module is operated in the second gear-shifting mode, the sheet pick-up roller is rotated in a second rotating speed.

In an embodiment, the movable shaft collar of the gear-shifting arm further includes a third claw part.

In an embodiment, the clutch transmission mechanism further includes a fixed shaft collar, which is sheathed around and fixed on the power input shaft and has a fourth claw part.

In an embodiment, the clutch transmission mechanism further includes a sleeve, a positioning ring and an elastic element. The sleeve is sheathed around the power input shaft and connected to the movable shaft collar. The fixed shaft collar is enclosed by the sleeve. The sleeve includes a poking part. The positioning ring is sheathed around and fixed on the power input shaft. The elastic element is arranged between the sleeve and the positioning ring. When a third pushing force is applied on the poking part, the sleeve moves the movable shaft collar of the gear-shifting arm toward the fixed shaft collar, so that the third claw part is engaged with the fourth claw part. The elastic element provides the first pushing force and the second pushing force to disengage the third claw part from the fourth claw part.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
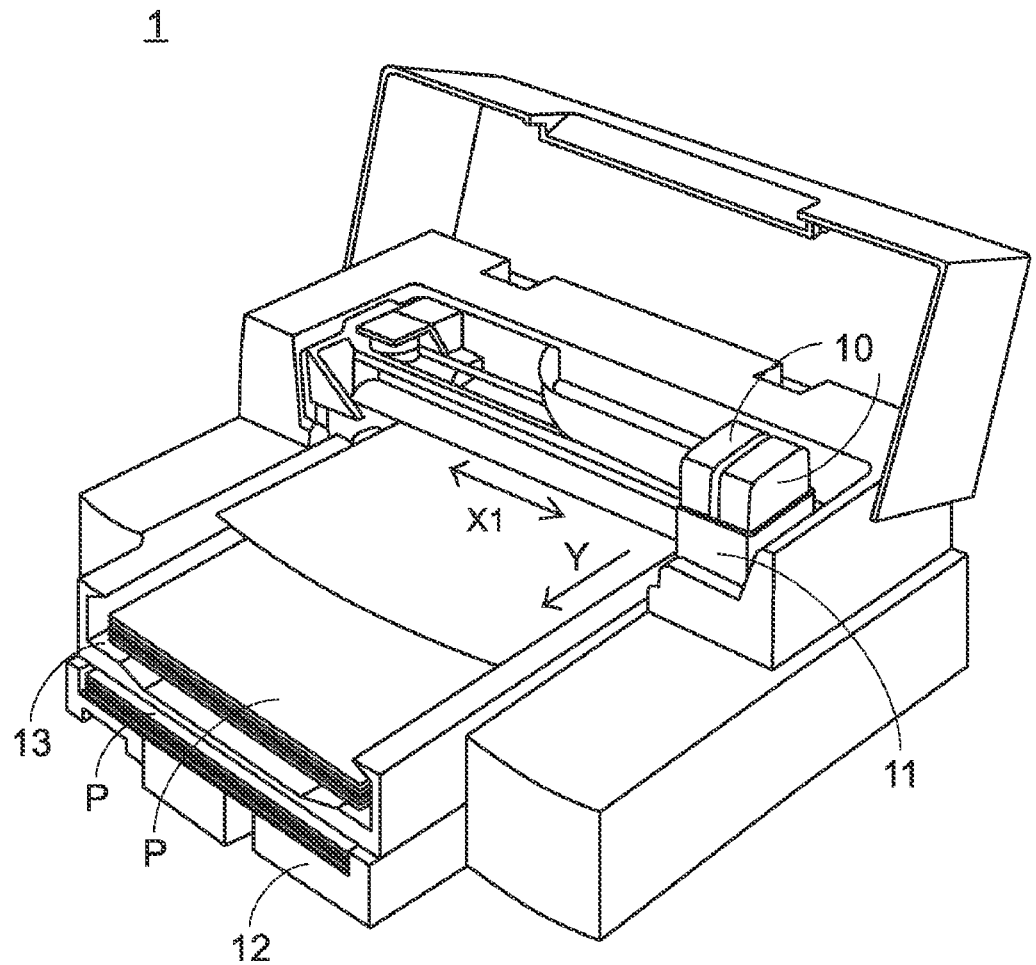
FIG. 1 is a schematic perspective view illustrating an inkjet printer according to the prior art.
Figure 2:
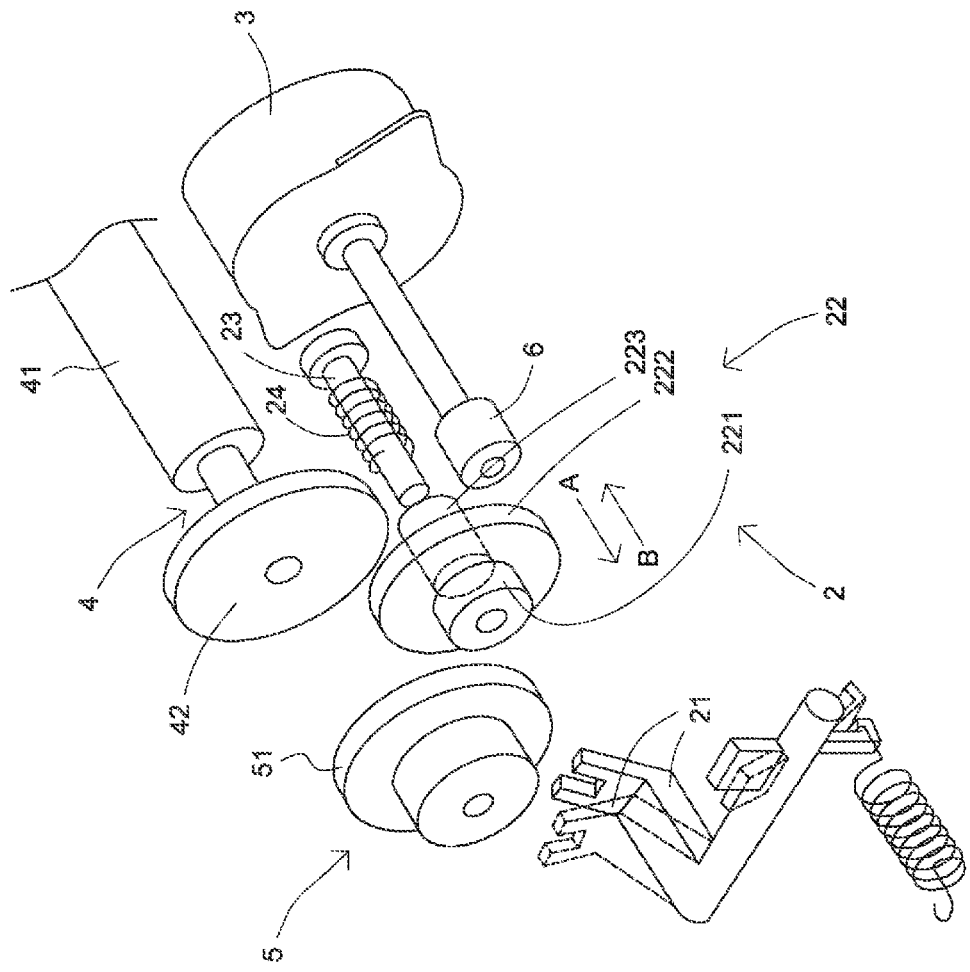
FIG. 2 is a schematic view illustrating a clutch-type power switching mechanism disclosed in U.S. Pat. No. 5,841,450.
Figure 3:
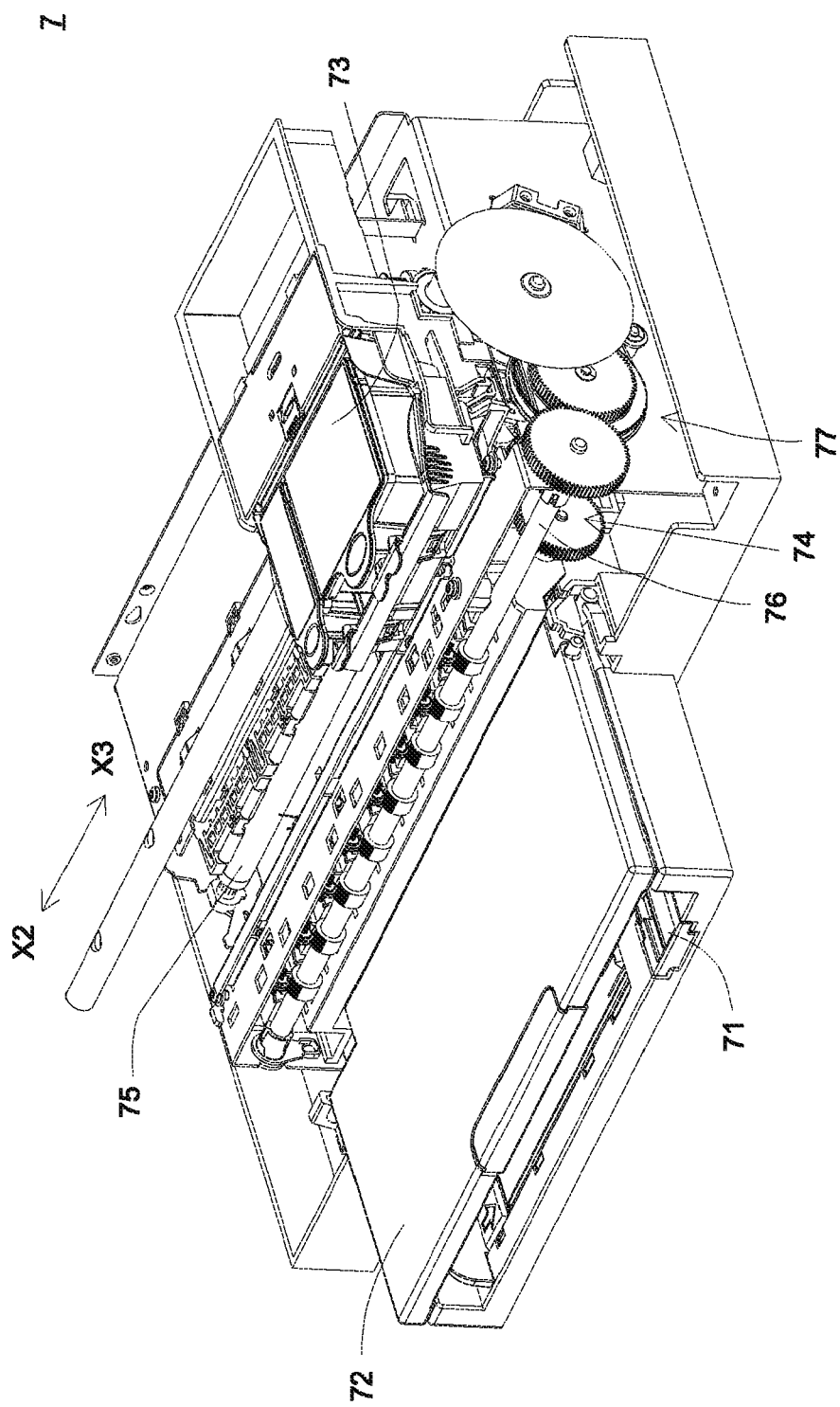
FIG. 3 is a schematic perspective view illustrating a portion of a printing device according to a first embodiment of the present invention.
Figure 4:
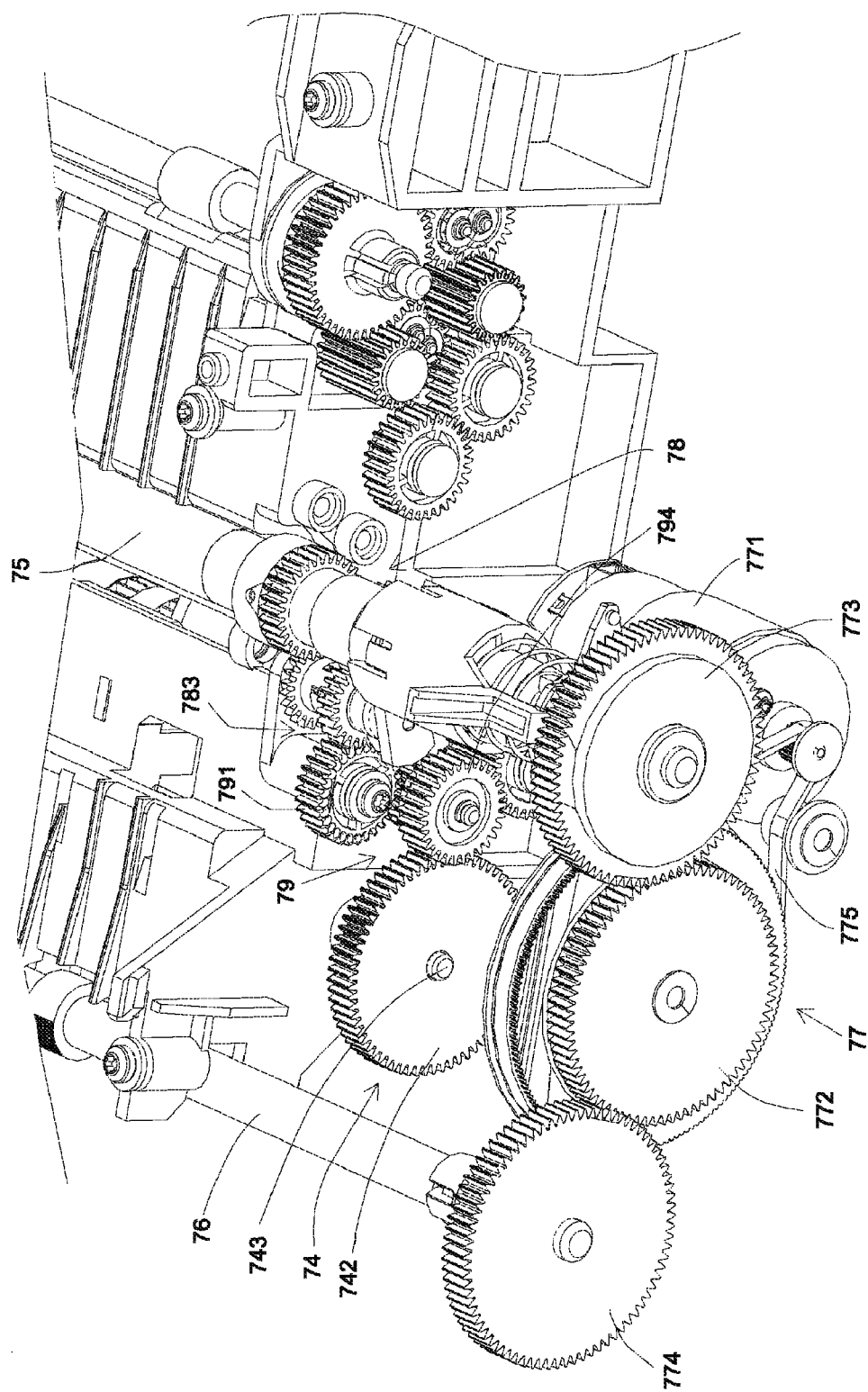
FIG. 4 is a schematic perspective view illustrating a clutch transmission mechanism and a transmission gear module of a printing device according to a first embodiment of the present invention.

FIG. 3 is a schematic perspective view illustrating a portion of a printing device according to a first embodiment of the present invention. FIG. 4 is a schematic perspective view illustrating a clutch transmission mechanism and a transmission gear module of a printing device according to a first embodiment of the present invention. As shown in FIGS. 3 and 4, the printing device 7 comprises a sheet input tray 71, a sheet output tray 72, an inkjet printing module 73, a sheet pick-up module 74, a sheet transfer shaft 75, a sheet ejecting shaft 76, a power module 77, a clutch transmission mechanism 78 and a transmission gear module 79. The blank paper is placed on the sheet input tray 71, and then fed into a fixed transmission path to be printed. The printed paper is exited to and placed on the sheet output tray 72. The sheet pick-up module 74 is used for feeding the paper into the transmission path. The paper within the transmission path is transported by the sheet transfer shaft 75. The printed paper is ejected out of the transmission path by the sheet ejecting shaft 76. Moreover, the inkjet printing module 73 is arranged in the transmission path. During the printing process, the inkjet printing module 73 is moved in the direction X2 or the direction X3 for ejecting ink on the blank paper. The direction X2 or the direction X3 is perpendicular to the feeding direction of the paper.

The power module 77 is used for providing a driving force to the components that require the driving force, thereby allowing normal operation of the printing device 7. The power module 77 comprises a motor 771, a first power gear 772, a second power gear 773, a third power gear 774 and a belt 775. The motor 771 is connected with the first power gear 772 through the belt 775, so that the first power gear 772 is driven by the motor 771 to rotate. The second power gear 773 and the third power gear 774 are respectively engaged with the first power gear 772, so that the second power gear 773 and the third power gear 774 are rotated with the first power gear 772. The third power gear 774 is sheathed around and fixed on the sheet ejecting shaft 76, so that the sheet ejecting shaft 76 is rotated with the third power gear 774. The rotation of the sheet ejecting shaft 76 will eject the paper out of the transmission path. The second power gear 773 is sheathed around and fixed on the sheet transfer shaft 75, so that the sheet transfer shaft 75 is rotated with the second power gear 773. The rotation of the sheet transfer shaft 75 will transport the paper that is within the transmission path The clutch transmission mechanism 78 and the transmission gear module 79 are arranged at a first side of the printing device 7. The clutch transmission mechanism 78 is used for transmitting the driving force of the power module 77 to the transmission gear module 79. As such, the transmission gear module 79 is operated in a first gear-shifting mode or a second gear-shifting mode.

Figure 5:
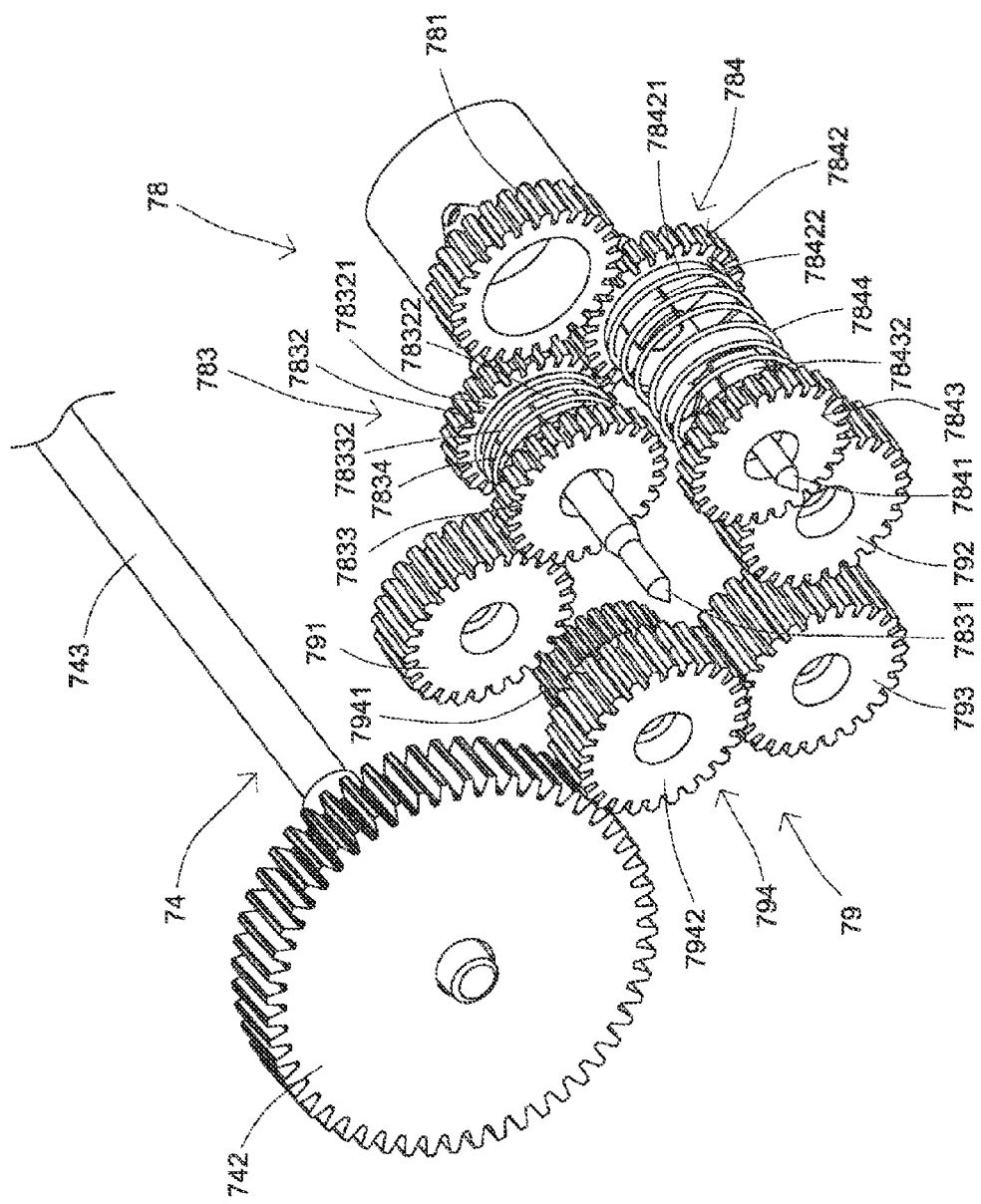
FIG. 5 is a schematic partial perspective view illustrating a clutch transmission mechanism and a transmission gear module of a printing device according to a first embodiment of the present invention.
Figure 6:
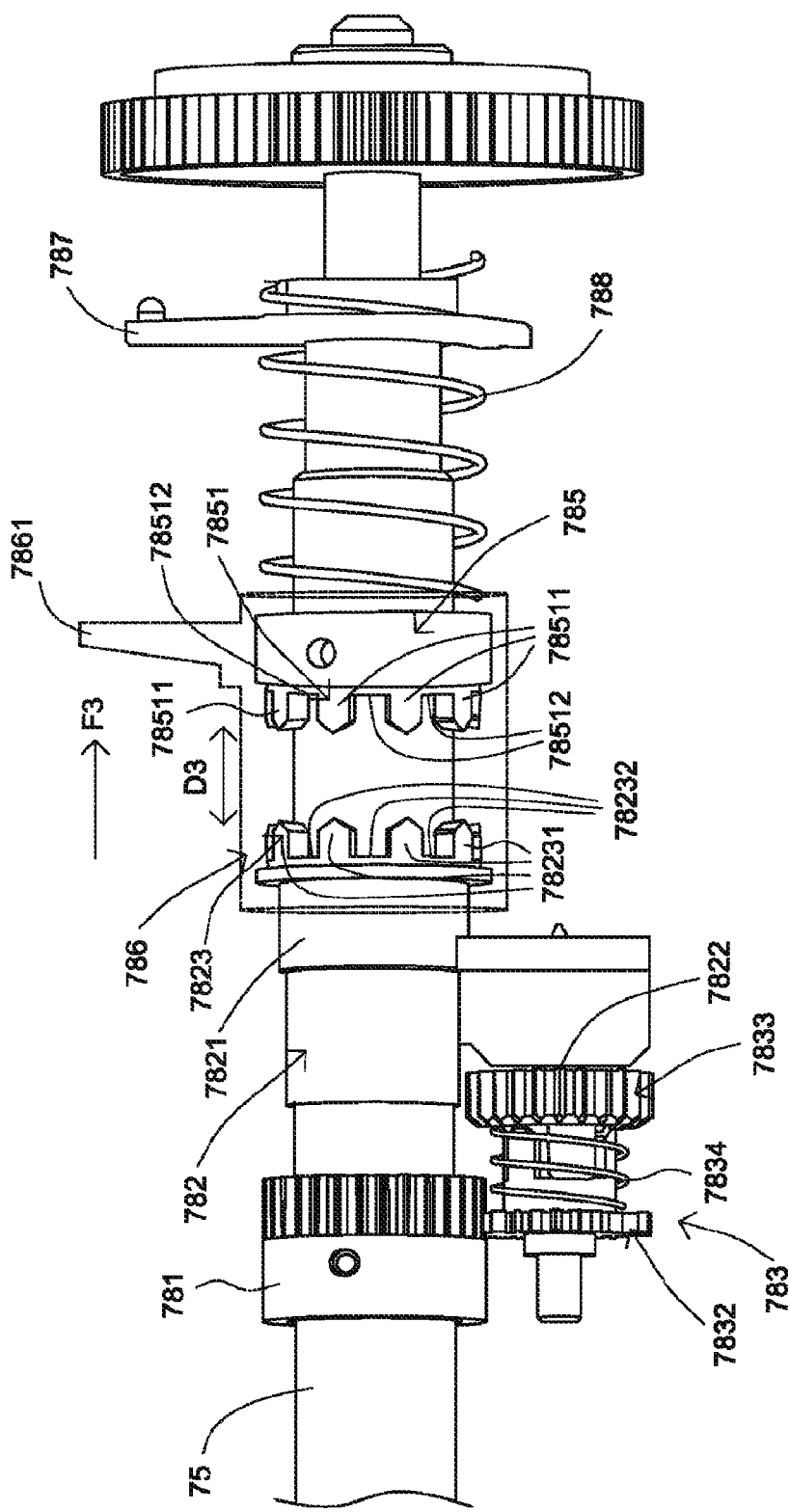
FIG. 6 is a schematic side view illustrating a clutch transmission mechanism according to a first embodiment of the present invention.
Figure 7:
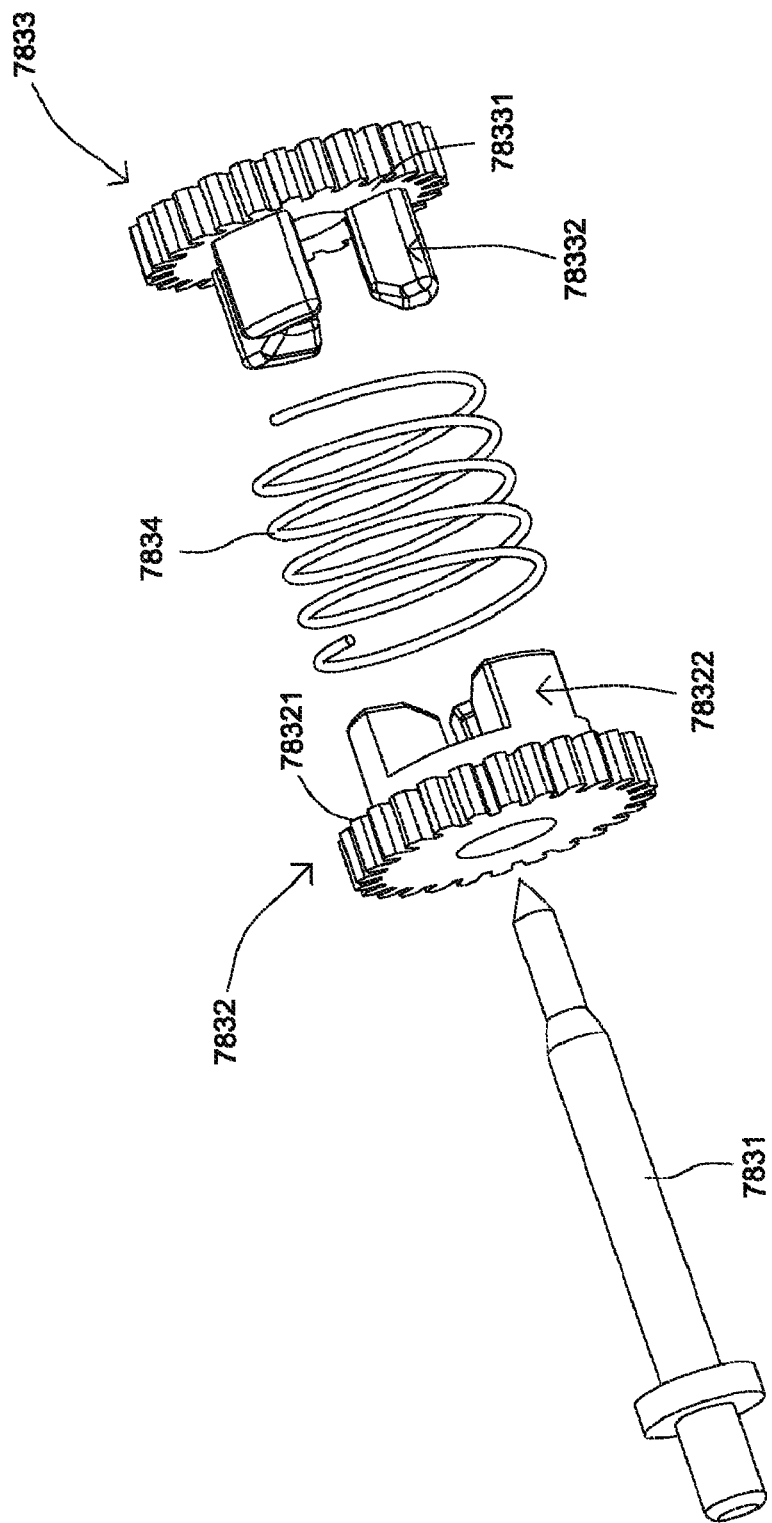
FIG. 7 is a schematic exploded view illustrating a first gear-shifting module of the clutch transmission mechanism according to a first embodiment of the present invention.
Figure 8:
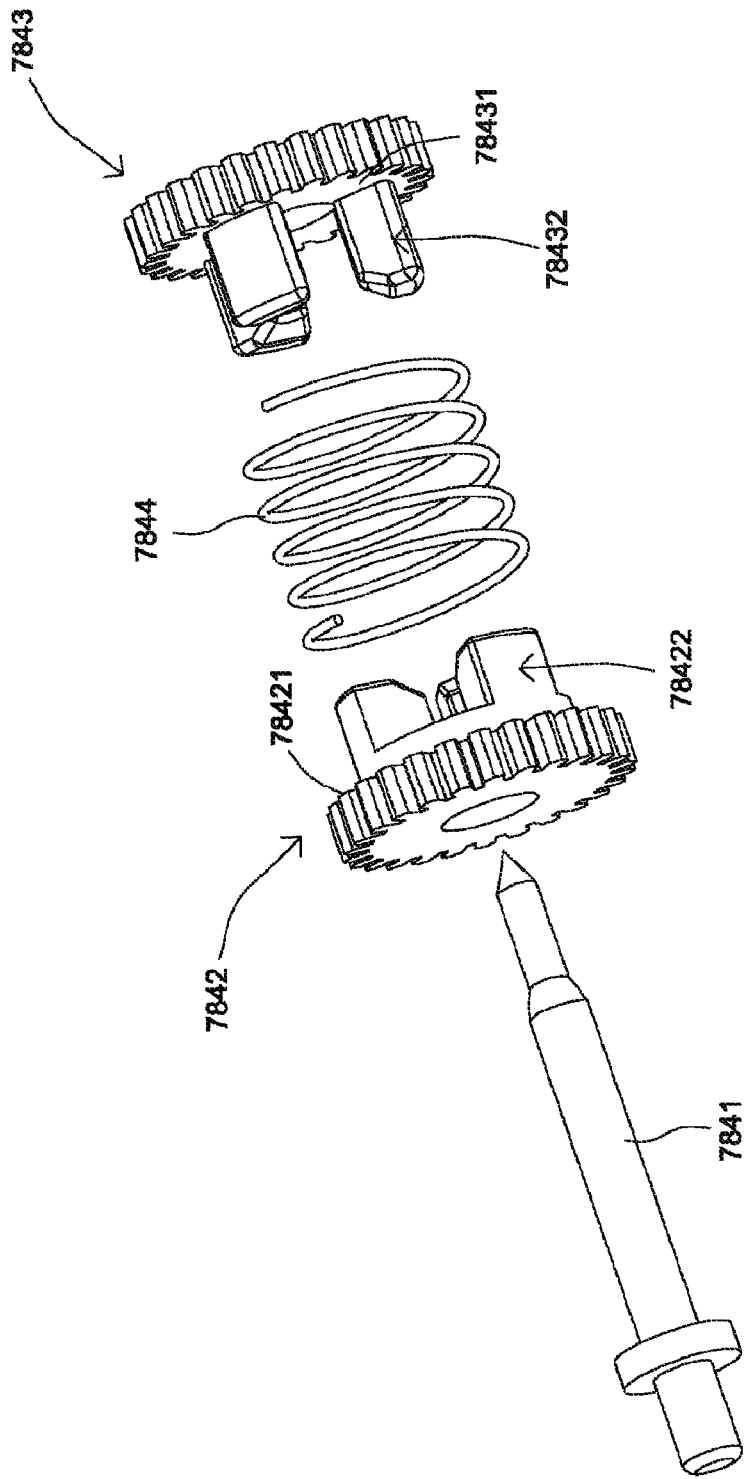
FIG. 8 is a schematic exploded view illustrating a second gear-shifting module of the clutch transmission mechanism according to a first embodiment of the present invention.

FIG. 5 is a schematic partial perspective view illustrating a clutch transmission mechanism and a transmission gear module of a printing device according to a first embodiment of the present invention. FIG. 6 is a schematic side view illustrating a clutch transmission mechanism according to a first embodiment of the present invention. FIG. 7 is a schematic exploded view illustrating a first gear-shifting module of the clutch transmission mechanism according to a first embodiment of the present invention. FIG. 8 is a schematic exploded view illustrating a second gear-shifting module of the clutch transmission mechanism according to a first embodiment of the present invention.

Please refer to FIGS. 5, 6, 7 and 8. The clutch transmission mechanism 78 comprises a power input shaft 75, a power input gear 781, a gear-shifting arm 782, a first gear-shifting module 783, a second gear-shifting module 784, a fixed shaft collar 785, a sleeve 786, a positioning ring 787 and a third elastic element 788. In this embodiment, the sheet transfer shaft 75 is served as the power input shaft 75. That is, the power input shaft 75 is driven to rotate by the driving force of the motor 771. The power input gear 781 is sheathed around and fixed on the power input shaft 75, so that the power input gear 781 is rotated with the power input shaft 75.

The first gear-shifting module 783 comprises a first clutch shaft 7831, a first connecting gear 7832, a first clutch gear 7833 and a first elastic element 7834. The first clutch shaft 7831 is disposed on the printing device 7. The first connecting gear 7832 is sheathed around the first clutch shaft 7831 and engaged with the power input gear 781. The first connecting gear 7832 comprises a first claw surface 78321. A first claw part 78322 is disposed on the first claw surface 78321. As such, the first claw part 78322 is rotated with the first connecting gear 7832. The first clutch gear 7833 is also sheathed around the first clutch shaft 7831. The first clutch gear 7833 comprises a second claw surface 78331. A second claw part 78332 is disposed on the second claw surface 78331. As such, the first clutch gear 7833 is driven to rotate by the second claw part 78332. The first elastic element 7834 is arranged between the first claw surface 78321 of the first connecting gear 7832 and the second claw surface 78331 of the first clutch gear 7833 for providing a first elastic force. In response to the first elastic force, the first claw part 78322 and the second claw part 78332 are separated from each other by a first spacing interval D1 (see FIG. 9A).

Similarly, the second gear-shifting module 784 comprises a second clutch shaft 7841, a second connecting gear 7842, a second clutch gear 7843 and a second elastic element 7844. The second clutch shaft 7841 is disposed on the printing device 7. The second connecting gear 7842 is sheathed around the second clutch shaft 7841 and engaged with the power input gear 781. The second connecting gear 7842 comprises a third claw surface 78421. A third claw part 78422 is disposed on the third claw surface 78421. As such, the third claw part 78422 is rotated with the second connecting gear 7842. The second clutch gear 7843 is also sheathed around the second clutch shaft 7841. The second clutch gear 7843 comprises a fourth claw surface 78431. A fourth claw part 78432 is disposed on the fourth claw surface 78431. As such, the second clutch gear 7843 is driven to rotate by the fourth claw part 78432. The second elastic element 7844 is arranged between the third claw surface 78421 of the second connecting gear 7842 and the fourth claw surface 78431 of the second clutch gear 7843 for providing a second elastic force. In response to the second elastic force, the third claw part 78422 and the fourth claw part 78432 are separated from each other by a second spacing interval D2 (see FIG. 10A).

The gear-shifting arm 782 comprises a movable shaft collar 7821 and a sustaining part 7822. The movable shaft collar 7821 comprises a fifth claw part 7823. The movable shaft collar 7821 is sheathed around the power input shaft 75 and movable along the power input shaft 75. In a case that the movable shaft collar 7821 is rotated relative to the power input shaft 75, the sustaining part 7822 is synchronously rotated relative to the power input shaft 75. In addition, the fixed shaft collar 785 has a sixth claw part 7851. The fixed shaft collar 785 is sheathed around and fixed on the power input shaft 75, so that the fixed shaft collar 785 and the sixth claw part 7851 are rotated with the power input shaft 75. The sleeve 786 comprises a poking part 7861. The sleeve 786 is sheathed around the power input shaft 75, and connected to the movable shaft collar 7821. The sleeve 786 also encloses the fixed shaft collar 785. In a case that the sleeve 786 is moved along the power input shaft 75, the movable shaft collar 7821 of the gear-shifting arm 782 is synchronously moved. The positioning ring 787 is sheathed around and fixed on the power input shaft 75. The third elastic element 788 is arranged between the sleeve 786 and the positioning ring 787 for providing a third elastic force. In response to the third elastic force, the fifth claw part 7823 and the sixth claw part 7851 are separated from each other by a third spacing interval D3.

Figure 9A:
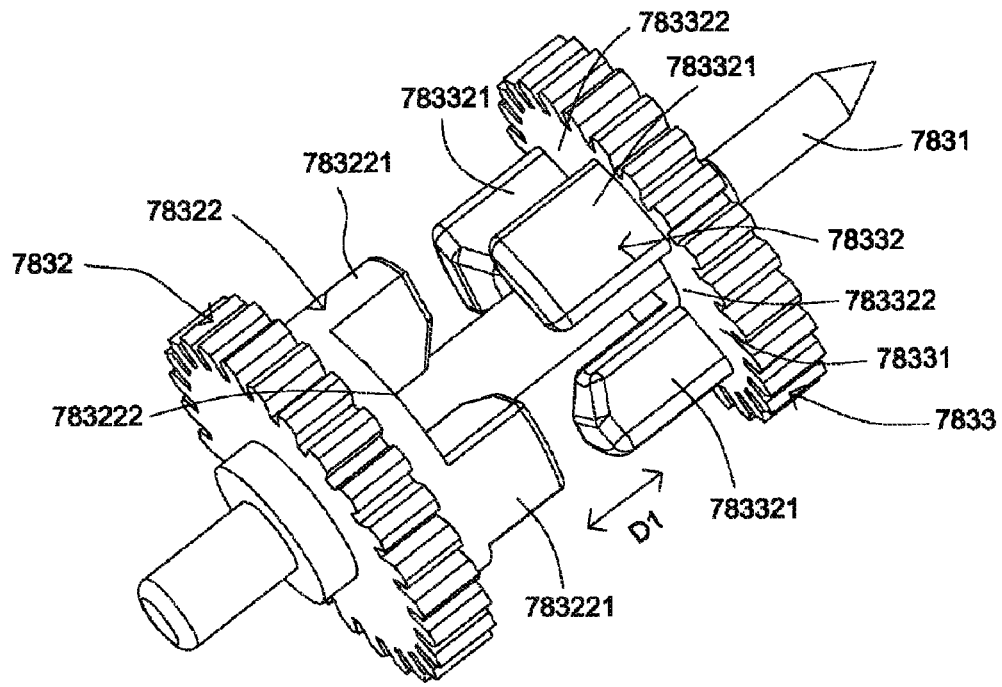
FIGS. 9A and 9B are schematic partial perspective views illustrating the first gear-shifting module of the clutch transmission mechanism according to a first embodiment of the present invention.
Figure 9B:
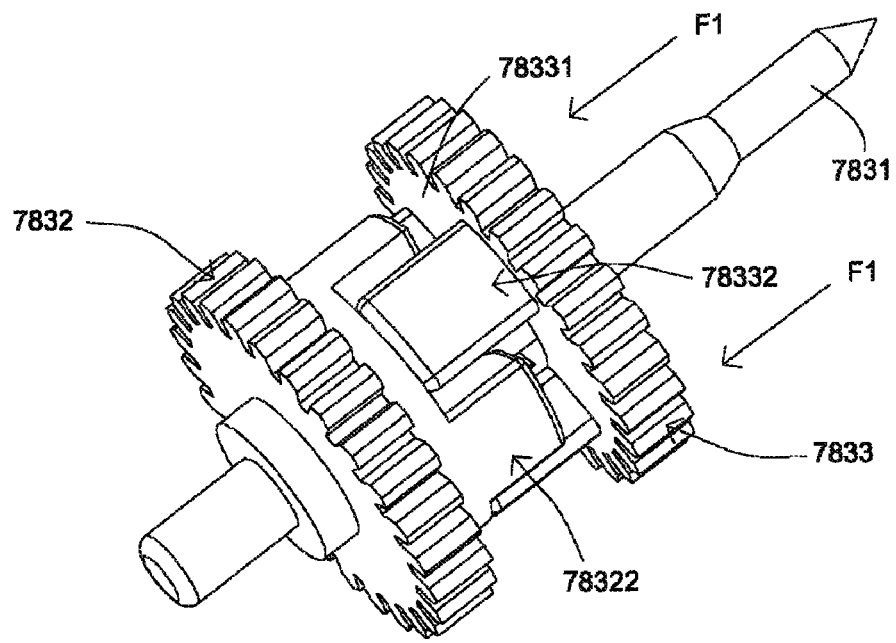

FIGS. 9A and 9B are schematic partial perspective views illustrating the first gear-shifting module of the clutch transmission mechanism according to a first embodiment of the present invention. The first claw part 78322 of the first connecting gear 7832 has plural convex structures 783221 and plural concave structures 783222. The second claw part 78332 of the first clutch gear 7833 also has plural convex structures 783321 and plural concave structures 783322. In response to the first elastic force provided by the first elastic element 7834 (not shown in FIG. 9, please refer to FIG. 7), the first claw part 78322 and the second claw part 78332 are separated from each other by the first spacing interval D1. Meanwhile, the relative positions of the first claw part 78322 and the second claw part 78332 are shown in FIG. 9A. By applying a first pushing force F1 greater than the first elastic force on the first clutch gear 7833, the first clutch gear 7833 is moved toward the first connecting gear 7832, so that the first claw part 78322 and the second claw part 78332 are engaged with each other. That is, the convex structures 783221 of the first claw part 78322 are inserted into the concave structures 783322 of the second claw part 78332, and the convex structures 783321 of the second claw part 78332 are inserted into the concave structures 783222 of the first claw part 78322 (see FIG. 9B). At this moment, the rotation of the first connecting gear 7832 will cause rotation of the first clutch gear 7833. Since the first claw part 78322 and the second claw part 78332 are engaged with each other, the first connecting gear 7832 and the first clutch gear 7833 are collectively rotated with the first clutch shaft 7831.

Figure 10A:
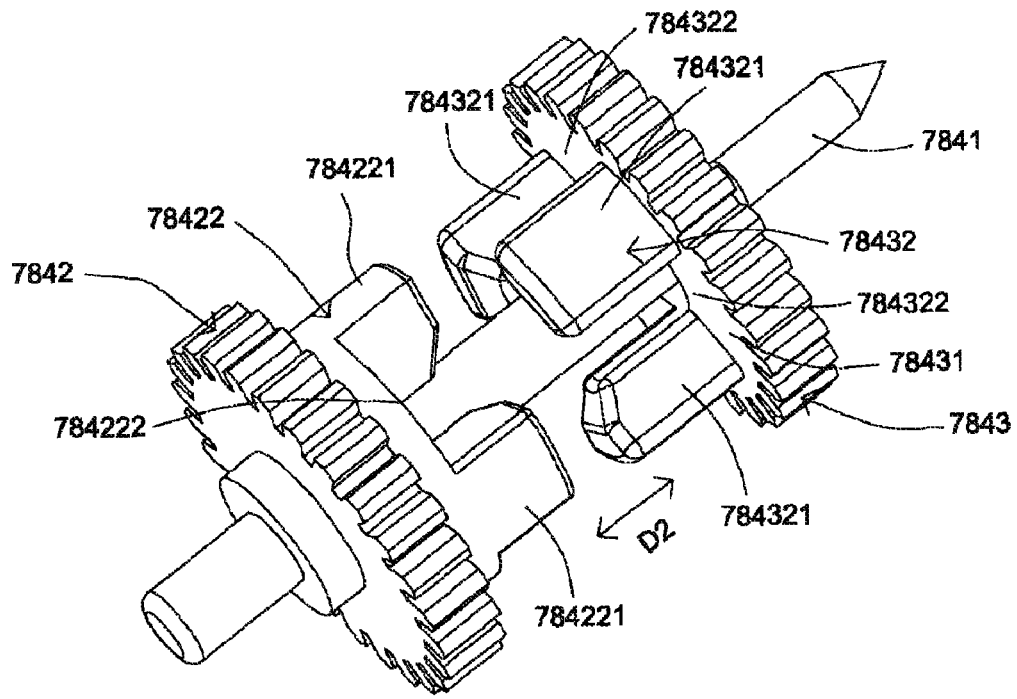
FIGS. 10A and 10B are schematic partial perspective views illustrating the second gear-shifting module of the clutch transmission mechanism according to a first embodiment of the present invention.
Figure 10B:
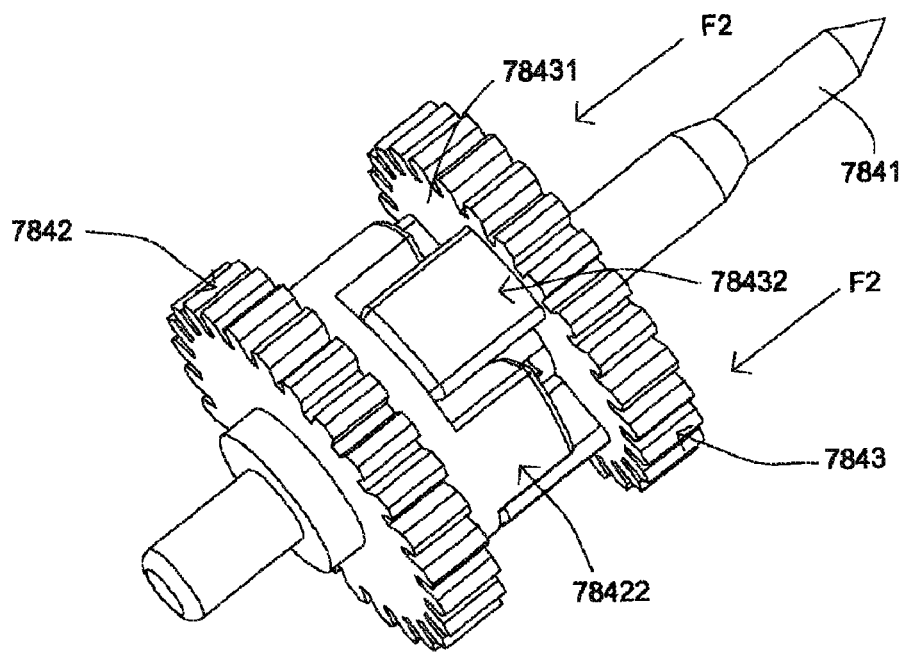

FIGS. 10A and 10B are schematic partial perspective views illustrating the second gear-shifting module of the clutch transmission mechanism according to a first embodiment of the present invention. The third claw part 78422 of the second connecting gear 7842 has plural convex structures 784221 and plural concave structures 784222. The fourth claw part 78432 of the second clutch gear 7843 also has plural convex structures 784321 and plural concave structures 784322. In response to the second elastic force provided by the second elastic element 7844 (not shown in FIG. 10, please refer to FIG. 8), the third claw part 78422 and the fourth claw part 78432 are separated from each other by the second spacing interval D2. Meanwhile, the relative positions of the third claw part 78422 and the fourth claw part 78432 are shown in FIG. 10A. By applying a second pushing force F2 greater than the second elastic force on the second clutch gear 7843, the second clutch gear 7843 is moved toward the second connecting gear 7842, so that the third claw part 78422 and the fourth claw part 78432 are engaged with each other. That is, the convex structures 784221 of the third claw part 78422 are inserted into the concave structures 784322 of the fourth claw part 78432, and the convex structures 784321 of the fourth claw part 78432 are inserted into the concave structures 784222 of the fourth claw part 78422 (see FIG. 10B). At this moment, the rotation of the second connecting gear 7842 will cause rotation of the second clutch gear 7843. Since the third claw part 78422 and the fourth claw part 78432 are engaged with each other, the second connecting gear 7842 and the second clutch gear 7843 are collectively rotated with the second clutch shaft 7841.

Please refer to FIG. 6 again. The fifth claw part 7823 of the movable shaft collar 7821 comprises plural convex structures 78231 and plural concave structures 78232. The sixth claw part 7851 of the fixed shaft collar 785 comprises plural convex structures 78511 and plural concave structures 78512 (see FIG. 6). In a case that the fifth claw part 7823 and the sixth claw part 7851 are engaged with each other, the convex structures 78231 of the fifth claw part 7823 are inserted into the concave structures 78512 of the sixth claw part 7851, and the convex structures 78511 of the sixth claw part 7851 are inserted into the concave structures 78232 of the fifth claw part 7823. At this moment, the rotation of the fixed shaft collar 785 will cause rotation of the movable shaft collar 7821. As such, the fixed shaft collar 785 and the movable shaft collar 7821 are collectively rotated with the power input shaft 75.

Please refer to FIG. 5 again. The transmission gear module 79 comprises a first transmission gear 791, a second transmission gear 792, a third transmission gear 793 and a fourth transmission gear 794. The fourth transmission gear 794 comprises a first-layered gear 7941 and a second-layered gear 7942. The first-layered gear 7941 is engaged with the first transmission gear 791. The second-layered gear 7942 is engaged with the third transmission gear 793. The third transmission gear 793 is also engaged with the second transmission gear 792. When the first claw part 78322 and the second claw part 78332 are engaged with each other, the first clutch gear 7833 is engaged with the first transmission gear 791. Whereas, when the third claw part 78422 and the fourth claw part 78432 are engaged with each other, the second clutch gear 7843 is engaged with the second transmission gear 792.

Hereinafter, the operating principles of the clutch transmission mechanism of the printing device according to this embodiment of the present invention will be illustrated with reference to FIGS. 5 and 6. For operating the transmission gear module 79 in the first gear-shifting mode, a third pushing force F3 greater than the third elastic force is applied on the poking part 7861 of the sleeve 786. In response to the third pushing force F3, the sleeve 786 is moved toward the positioning ring 787. As such, the movable shaft collar 7821 is moved toward the fixed shaft collar 785, and the fifth claw part 7823 is engaged with the sixth claw part 7851. Then, the fixed shaft collar 785 is rotated with the power input shaft 75 by a first angle. Due to the engagement between the fifth claw part 7823 and the sixth claw part 7851, the movable shaft collar 7821 of the gear-shifting arm 782 is also rotated by the first angle. Meanwhile, the sustaining part 7822 of the gear-shifting arm 782 and the first gear-shifting module 783 are spaced from each other in parallel. Next, the third pushing force F3 is no longer applied on the poking part 7861 of the sleeve 786, so that the third elastic force is exerted on the sleeve 786. In response to the third elastic force, the movable shaft collar 7821 is moved in a direction distant from the fixed shaft collar 785. That is, the third elastic force provides the first pushing force F1 to the sustaining part 7822. In response to the first pushing force F1, the sustaining part 7822 pushes the first clutch gear 7833 toward the first connecting gear 7832, and thus the second claw part 78332 of the first clutch gear 7833 and the first claw part 78322 of the first connecting gear 7832 are engaged with each other. Then, the power input shaft 75 is driven to rotate by the driving force of the motor 771. Upon rotation of the power input shaft 75, the power input gear 781 is synchronously rotated. Since the first connecting gear 7832 is engaged with the power input gear 781, the first connecting gear 7832 is rotated with the power input gear 781. Due to the engagement between the first claw part 78322 and the second claw part 78332, the first clutch gear 7833 is also rotated. Meanwhile, since the first clutch gear 7833 is engaged with the first transmission gear 791 of the transmission gear module 79, the fourth transmission gear 794 of the transmission gear module 79 is rotated at a specified rotating speed.

By the way, during the inkjet printing module 73 is moved in the direction X3 (see also FIG. 3), the inkjet printing module 73 will be contacted with the poking part 7861 to push the poking part 7861 of the sleeve 786, so that the third pushing force F3 is generated. It is noted that the third pushing force F3 may be generated in any other approaches.

For switching the operating mode of the transmission gear module 79 from the first gear-shifting mode to the second gear-shifting mode, the rotation of the power input shaft 75 is firstly stopped. Then, the third pushing force F3 is applied on the poking part 7861 of the sleeve 786 again. In response to the third pushing force F3, the sleeve 786 is moved toward the positioning ring 787, the movable shaft collar 7821 is moved toward the fixed shaft collar 785, and the fifth claw part 7823 is engaged with the sixth claw part 7851. Then, the fixed shaft collar 785 is rotated with the power input shaft 75 by a second angle. Due to the engagement between the fifth claw part 7823 and the sixth claw part 7851, the movable shaft collar 7821 of the gear-shifting arm 782 is also rotated by the second angle. Meanwhile, the sustaining part 7822 of the gear-shifting arm 782 and the second gear-shifting module 784 are spaced from each other in parallel. Next, the third pushing force F3 is no longer applied on the poking part 7861 of the sleeve 786, so that the third elastic force is exerted on the sleeve 786. In response to the third elastic force, the movable shaft collar 7821 is moved in a direction distant from the fixed shaft collar 785. That is, the third elastic force provides the second pushing force F2 to the sustaining part 7822. In response to the second pushing force F2, the sustaining part 7822 pushes the second clutch gear 7843 toward the second connecting gear 7842, and thus the fourth claw part 78432 of the second clutch gear 7843 and the third claw part 78422 of the second connecting gear 7842 are engaged with each other. Then, the power input shaft 75 is driven to rotate by the driving force of the motor 771. Upon rotation of the power input shaft 75, the power input gear 781 is synchronously rotated. Since the second connecting gear 7842 is engaged with the power input gear 781, the second connecting gear 7842 is rotated with the power input gear 781. Due to the engagement between the third claw part 78422 and the fourth claw part 78432, the second clutch gear 7843 is also rotated. Meanwhile, since the second clutch gear 7843 is engaged with the second transmission gear 792 of the transmission gear module 79, the fourth transmission gear 794 of the transmission gear module 79 is rotated at a another specified rotating speed.

Figure 11:
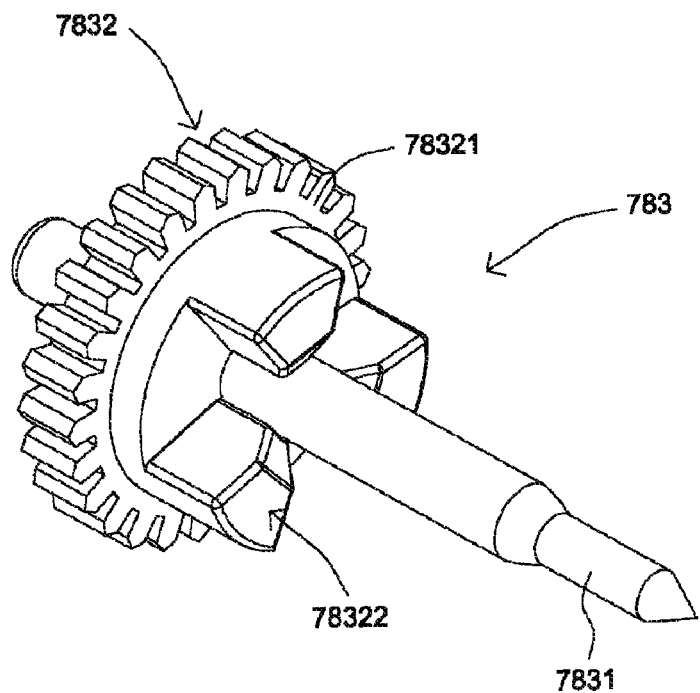
FIG. 11 is a schematic perspective view illustrating a first gear-shifting module of the clutch transmission mechanism according to a second embodiment of the present invention.
Figure 12:
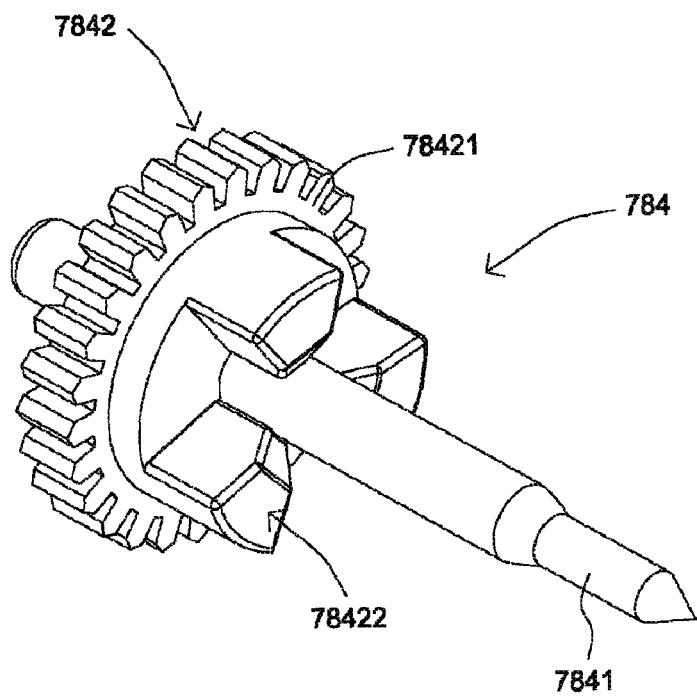
FIG. 12 is a schematic perspective view illustrating a second gear-shifting module of the clutch transmission mechanism according to a second embodiment of the present invention.
Figure 13:
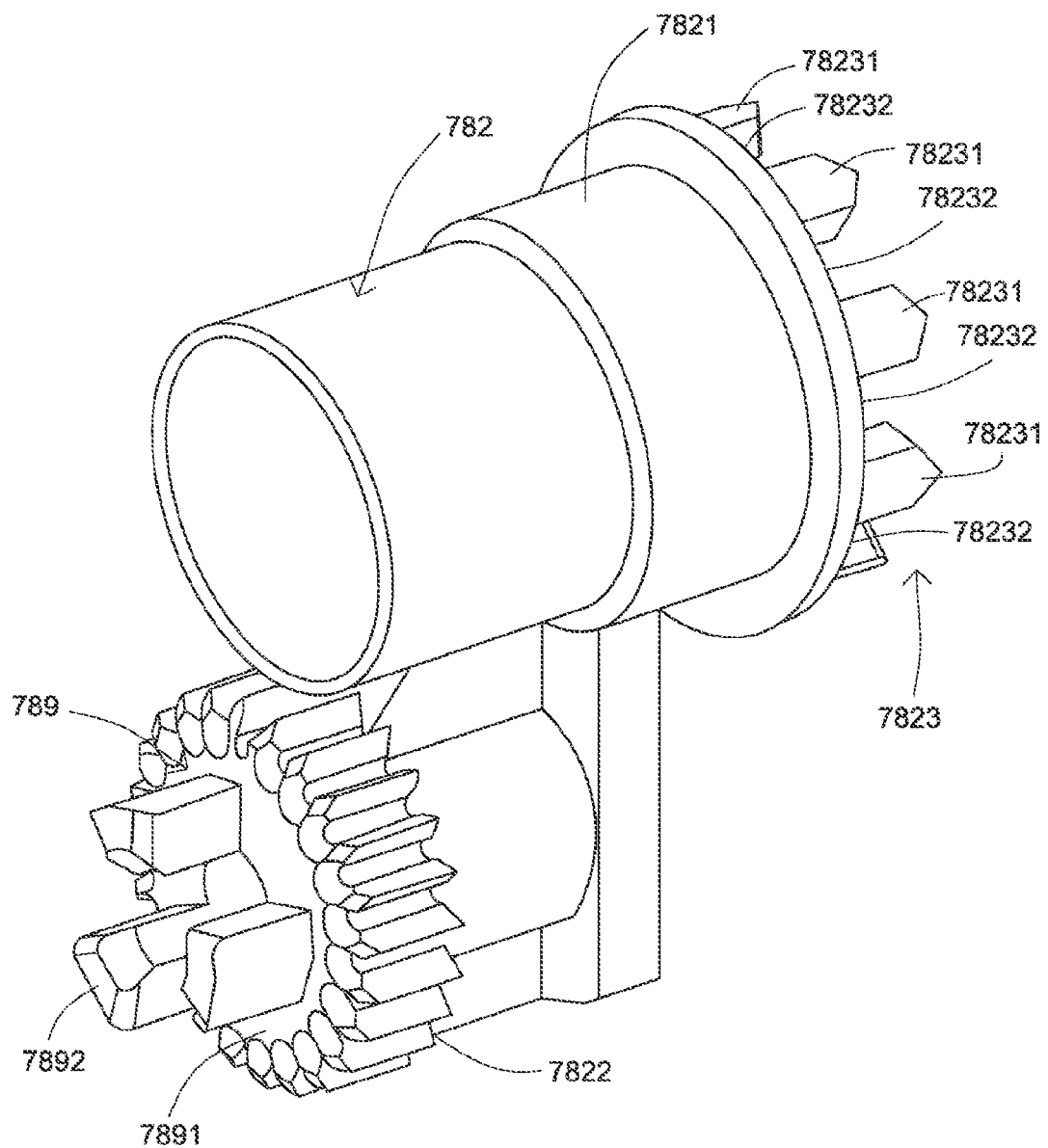
FIG. 13 is a schematic perspective view illustrating the relation between the gear-shifting arm and the clutch gear of the clutch transmission mechanism according to a second embodiment of the present invention.

The present invention also provides another clutch transmission mechanism 78. FIG. 11 is a schematic perspective view illustrating a first gear-shifting module of the clutch transmission mechanism according to a second embodiment of the present invention. FIG. 12 is a schematic perspective view illustrating a second gear-shifting module of the clutch transmission mechanism according to a second embodiment of the present invention. FIG. 13 is a schematic perspective view illustrating the relation between the gear-shifting arm and the clutch gear of the clutch transmission mechanism according to a second embodiment of the present invention. Please refer to FIGS. 11, 12 and 13. In comparison with the first embodiment, the first gear-shifting module 783 of the second embodiment only comprises the first clutch shaft 7831 and the first connecting gear 7832, but the first clutch gear 7833 and the first elastic element 7834 are not included. In addition, the second gear-shifting module 784 of the second embodiment only comprises the second clutch shaft 7841 and the second connecting gear 7842, but the second clutch gear 7843 and the second elastic element 7844 are not included. The clutch transmission mechanism 78 of the second embodiment further comprises a clutch gear 789. The clutch gear 789 has a clutch claw surface 7891. A clutch claw part 7892 is disposed on the clutch claw surface 7891. The clutch claw part 7892 has the function similar to the second claw part 78332 and the fourth claw part 78432. The clutch gear 789 is connected to the sustaining part 7822 of the gear-shifting arm 782. In a case that the movable shaft collar 7821 is rotated relative to the power input shaft 75, the sustaining part 7822 and the clutch gear 789 are synchronously rotated relative to the power input shaft 75.

The clutch transmission mechanism of the printing device according to this embodiment of the present invention is simplified when compared with the first embodiment. In a case that the movable shaft collar 7821 of the gear-shifting arm 782 is rotated by a first angle and a pushing force resulted from the third elastic force is applied on the movable shaft collar 7821, the movable shaft collar 7821 is moved toward the first connecting gear 7832. As such, the clutch gear 789 is moved toward the first connecting gear 7832 and the first clutch shaft 7831 penetrates through the clutch gear 789, thereby causing engagement between the clutch claw part 7892 of the clutch gear 789 and the first claw part 78322 of the first connecting gear 7832. Meanwhile, the first connecting gear 7832 and the clutch gear 789 are collectively rotated with the first clutch shaft 7831. Then, by the above-mentioned procedures, the transmission gear module 79 is driven to operate in the first gear-shifting mode. Whereas, in a case that the movable shaft collar 7821 of the gear-shifting arm 782 is rotated by a second angle and a pushing force resulted from the third elastic force is applied on the movable shaft collar 7821, the movable shaft collar 7821 is moved toward the second connecting gear 7842. As such, the clutch gear 789 is moved toward the second connecting gear 7842 and the second clutch shaft 7841 penetrates through the clutch gear 789, thereby causing engagement between the clutch claw part 7892 of the clutch gear 789 and the second claw part 78422 of the second connecting gear 7842. Meanwhile, the second connecting gear 7842 and the clutch gear 789 are collectively rotated with the second clutch shaft 7841. Then, by the above-mentioned procedures, the transmission gear module 79 is driven to operate in the second gear-shifting mode.

Figure 14:
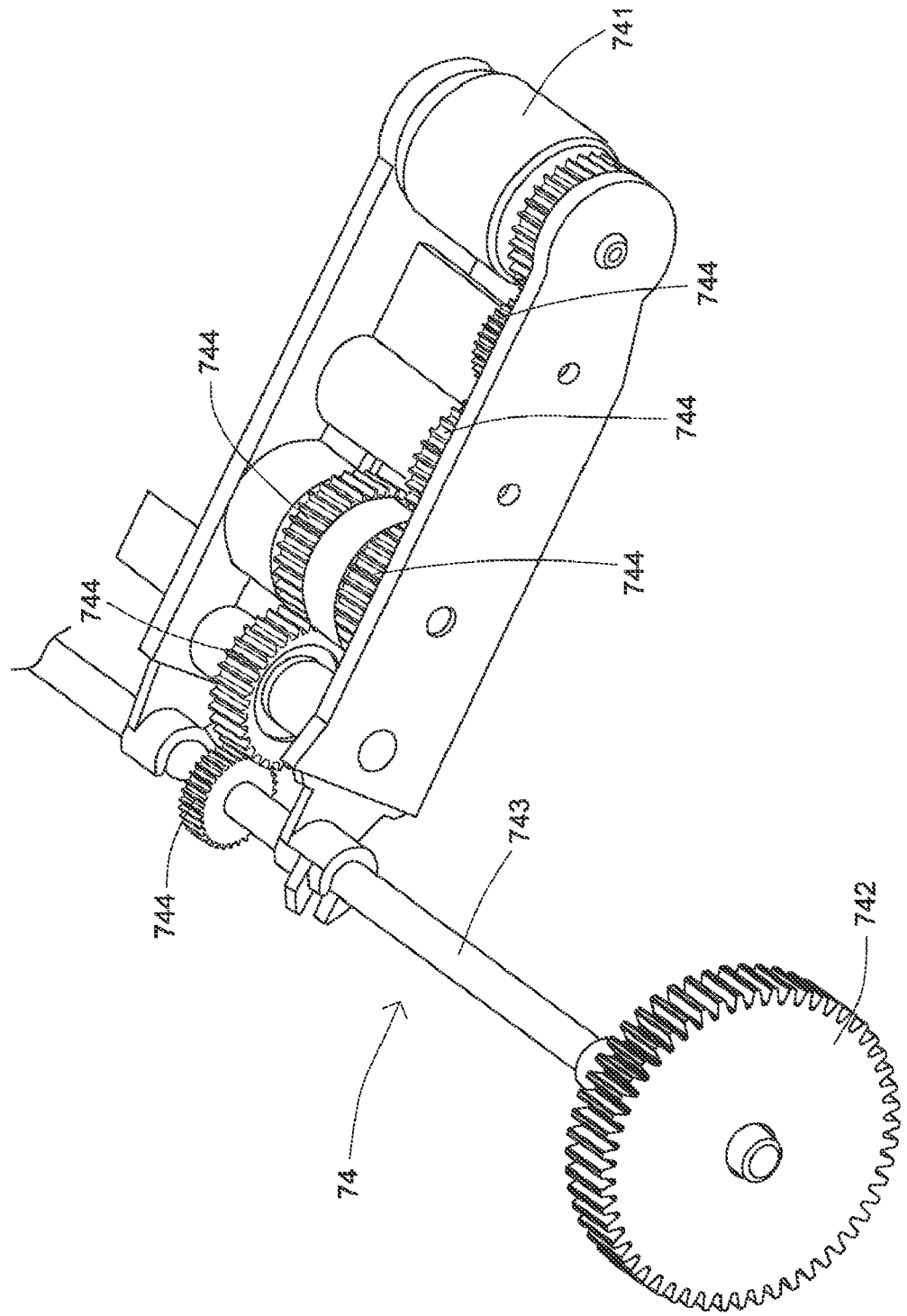
FIG. 14 is a schematic perspective view illustrating a sheet pick-up module according to an embodiment of the present invention.

FIG. 14 is a schematic perspective view illustrating a sheet pick-up module according to an embodiment of the present invention. Hereinafter, the application of the first gear-shifting module 783 and the second gear-shifting module 784 will be illustrated with reference to FIGS. 4, 5 and 14. The sheet pick-up module 74 comprises a sheet pick-up roller 741, a sheet pick-up gear 742, a driving shaft 743 and plural small gears 744. The sheet pick-up roller 741 is used for feeding the paper into a transmission path. The sheet pick-up roller 741 is connected with the plural small gears 744. The sheet pick-up gear 742 is engaged with the second-layer gear 7942 of the fourth transmission gear 794 of the transmission gear module 79. The sheet pick-up gear 742 is sheathed around the driving shaft 743 and fixed on the driving shaft 743. The driving shaft 743 is also connected with the plural small gears 744. In a case that the transmission gear module 79 is operated in the first gear-shifting mode and the fourth transmission gear 794 is rotated at the specified rotating speed, the sheet pick-up gear 742 is driven to rotate by the second-layer gear 7942 of the fourth transmission gear 794. As such, the driving shaft 743 is rotated with the sheet pick-up gear 742. As the driving shaft 743 is rotated, the plural small gears 744 are rotated, and thus the sheet pick-up roller 741 is rotated. Meanwhile, the sheet pick-up roller 741 is rotated at a first rotating speed. Whereas, in a case that the transmission gear module 79 is operated in the second gear-shifting mode and the fourth transmission gear 794 is rotated at the another specified rotating speed, the sheet pick-up gear 742 is driven to rotate by the second-layer gear 7942 of the fourth transmission gear 794. As such, the driving shaft 743 is rotated with the sheet pick-up gear 742. As the driving shaft 743 is rotated, the plural small gears 744 are rotated, and thus the sheet pick-up roller 741 is rotated. Meanwhile, the sheet pick-up roller 741 is rotated at a second rotating speed.

Since the sheet pick-up roller 741 is rotated at the first rotating speed or the second rotating speed to feed papers, the papers of the same material could be fed into the transmission path at different rotating speeds. Especially, the papers of different materials could be smoothly fed into the transmission path. In the above embodiments, the present invention is illustrated by referring to the printing device 7 having a first gear-shifting module 783 and a second gear-shifting module 784. Nevertheless, according to various requirements or functions, the printing device of the present invention may have one or more additional gear-shifting modules in order to transmit the driving force to desired components.

From the above description, in the clutch transmission mechanism 78 of the present invention, the engagement between the first connecting gear 7832 and the first clutch gear 7833, the engagement between the second connecting gear 7842 and the second clutch gear 7843, the engagement between the fixed shaft collar 785 and the movable shaft collar 7821, the engagement between the first connecting gear 7832 and the clutch gear 789, and the engagement between the second connecting gear 7842 and clutch gear 789 are coaxially rendered in the axial direction. As a consequence, the clutch transmission mechanism can safely and reliably switch different gear-shifting modes. In this situation, the gear transmission stability is enhanced, and the problem of causing noise is eliminated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A clutch transmission mechanism of a printing device for transmitting a driving force of said printing device to a transmission gear module of said printing device, said clutch transmission mechanism comprising:
  a power input shaft;
  a power input gear sheathed around and fixed on said power input shaft;
  a gear-shifting arm comprising a movable shaft collar and a sustaining part, wherein said movable shaft collar is sheathed around said power input shaft, and movable along said power input shaft;

a first gear-shifting module comprising:
- a first clutch shaft disposed on said printing device;
- a first connecting gear sheathed around said first clutch shaft and engaged with said power input gear, wherein said first connecting gear comprises a first claw surface, and a first claw part is disposed on said first claw surface;
- a first clutch gear sheathed around said first clutch shaft, wherein said first clutch gear comprises a second claw surface, and a second claw part is disposed on said second claw surface; and
- a first elastic element arranged between said first claw surface of said first connecting gear and said second claw surface of said first clutch gear for providing a first elastic force, so that said first claw part and said second claw part are separated from each other by a first spacing interval; and a second gear-shifting module comprising:
- a second clutch shaft disposed on said printing device;
- a second connecting gear sheathed around said second clutch shaft and engaged with said power input gear, wherein said second connecting gear comprises a third claw surface, and a third claw part is disposed on said third claw surface;
- a second clutch gear sheathed around said second clutch shaft, wherein said second clutch gear comprises a fourth claw surface, and a fourth claw part is disposed on said fourth claw surface; and
- a second elastic element arranged between said third claw surface of said second connecting gear and said fourth claw surface of said second clutch gear for providing a second elastic force, so that said third claw part and said fourth claw part are separated from each other by a second spacing interval, wherein when said movable shaft collar of said gear-shifting arm is rotated by a first angle and a first pushing force greater than said first elastic force is applied on said movable shaft collar, said sustaining part pushes said first clutch gear to cause engagement between said second claw part of said first clutch gear and said first claw part of said first connecting gear and engagement between said first clutch gear and said transmission gear module, so that said transmission gear module is driven to operate in a first gear-shifting mode, wherein when said movable shaft collar of said gear-shifting arm is rotated by a second angle and a second pushing force greater than said second elastic force is applied on said movable shaft collar, said sustaining part pushes said second clutch gear to cause engagement between said fourth claw part of said second clutch gear and said third claw part of said second connecting gear and engagement between said second clutch gear and said transmission gear module, so that said transmission gear module is driven to operate in a second gear-shifting mode.

2. The clutch transmission mechanism according to claim 1 wherein said printing device further comprises a sheet pick-up module, and said sheet pick-up module comprises:
- a sheet pick-up roller for feeding a paper into a feeding channel of said printing device;
- a sheet pick-up gear engaged with said transmission gear module; and
- a driving shaft for driving said sheet pick-up roller to rotate, wherein said driving shaft penetrates through said sheet pick-up gear, and said sheet pick-up gear is fixed on said driving shaft, so that said driving shaft is rotated with said sheet pick-up gear, wherein when said transmission gear module is operated in said first gear-shifting mode, said sheet pick-up roller is rotated in a first rotating speed, wherein when said transmission gear module is operated in said second gear-shifting mode, said sheet pick-up roller is rotated in a second rotating speed.

3. The clutch transmission mechanism according to claim 1 wherein said movable shaft collar of said gear-shifting arm further comprises a fifth claw part.

4. The clutch transmission mechanism according to claim 3 further comprising a fixed shaft collar, which is sheathed around and fixed on said power input shaft and has a six claw part.

5. The clutch transmission mechanism according to claim 4 further comprising:
- a sleeve sheathed around said power input shaft and connected to said movable shaft collar, wherein said fixed shaft collar is enclosed by said sleeve, and said sleeve comprises a poking part;
- a positioning ring sheathed around and fixed on said power input shaft; and
- a third elastic element arranged between said sleeve and said positioning ring, wherein when a third pushing force is applied on said poking part, said sleeve moves said movable shaft collar of said gear-shifting arm toward said fixed shaft collar, so that said fifth claw part is engaged with said sixth claw part, wherein said third elastic element provides said first pushing force and said second pushing force to disengage said fifth claw part from said sixth claw part.

* * * * *